US012101519B1

(12) United States Patent
Washburn et al.

(10) Patent No.: US 12,101,519 B1
(45) Date of Patent: Sep. 24, 2024

(54) SYSTEMS AND METHODS FOR DELIVERING STREAMING CONTENT

(71) Applicant: Accretive Technology Group, Inc., Seattle, WA (US)

(72) Inventors: Jordan Washburn, Louisville, CO (US); Alex Artushin, Austin, TX (US); Amir Pauker, Austin, TX (US); Jeremiah Seeley, Austin, TX (US); Ari Aosved, Port Orange, FL (US); James Maloney, Louisville, CO (US)

(73) Assignee: Accretive Technology Group, Inc., Seattle, WA (US)

( * ) Notice: Subject to any disclaimer, the term of this patent is extended or adjusted under 35 U.S.C. 154(b) by 0 days.

(21) Appl. No.: 17/505,032

(22) Filed: Oct. 19, 2021

Related U.S. Application Data

(60) Provisional application No. 63/105,491, filed on Oct. 26, 2020.

(51) Int. Cl.
*H04N 21/236* (2011.01)
*H04N 21/231* (2011.01)
*H04N 21/233* (2011.01)
*H04N 21/2343* (2011.01)
*H04N 21/643* (2011.01)

(52) U.S. Cl.
CPC ......... *H04N 21/236* (2013.01); *H04N 21/231* (2013.01); *H04N 21/2335* (2013.01); *H04N 21/2343* (2013.01); *H04N 21/643* (2013.01)

(58) Field of Classification Search
CPC ............... H04N 21/236; H04N 21/231; H04N 21/2335; H04N 21/2343; H04N 21/643
See application file for complete search history.

(56) References Cited

U.S. PATENT DOCUMENTS

| | | | |
|---|---|---|---|
| 11,089,386 B1 * | 8/2021 | Bernstein | H04N 21/8547 |
| 2016/0037176 A1 * | 2/2016 | Chari | H04L 65/70 375/240.26 |
| 2019/0149819 A1 * | 5/2019 | Phillips | H04N 19/80 375/240.02 |
| 2019/0327506 A1 * | 10/2019 | Zou | G06F 9/5038 |
| 2020/0275171 A1 * | 8/2020 | Cloud | H04N 21/8456 |
| 2020/0344498 A1 * | 10/2020 | Lazar | H04N 21/234 |
| 2021/0168472 A1 * | 6/2021 | Monaco | H04N 21/23406 |
| 2021/0274266 A1 * | 9/2021 | Lohmar | H04L 65/70 |

* cited by examiner

*Primary Examiner* — Mulugeta Mengesha
(74) *Attorney, Agent, or Firm* — FisherBroyles LLP; Alan D. Minsk

(57) ABSTRACT

A system architecture and methods for streaming or live video that can provide sub-second video over WebRTC to viewers with a horizontally scaling architecture. In some embodiments, the system and methods described generate video from another source on a server and redistribute it to client devices in a peer-to-peer architecture. The system and architecture are designed to deliver WebRTC to users but does not require broadcasters to change the systems and protocols they are familiar with and comfortable with using. Embodiments are directed to providing streaming audio and/or video content through an architecture that can ingress (intake) RTMP format content and egress (output and distribute) WebRTC format content efficiently by generating a client-side peer and client-side content on a server.

20 Claims, 8 Drawing Sheets

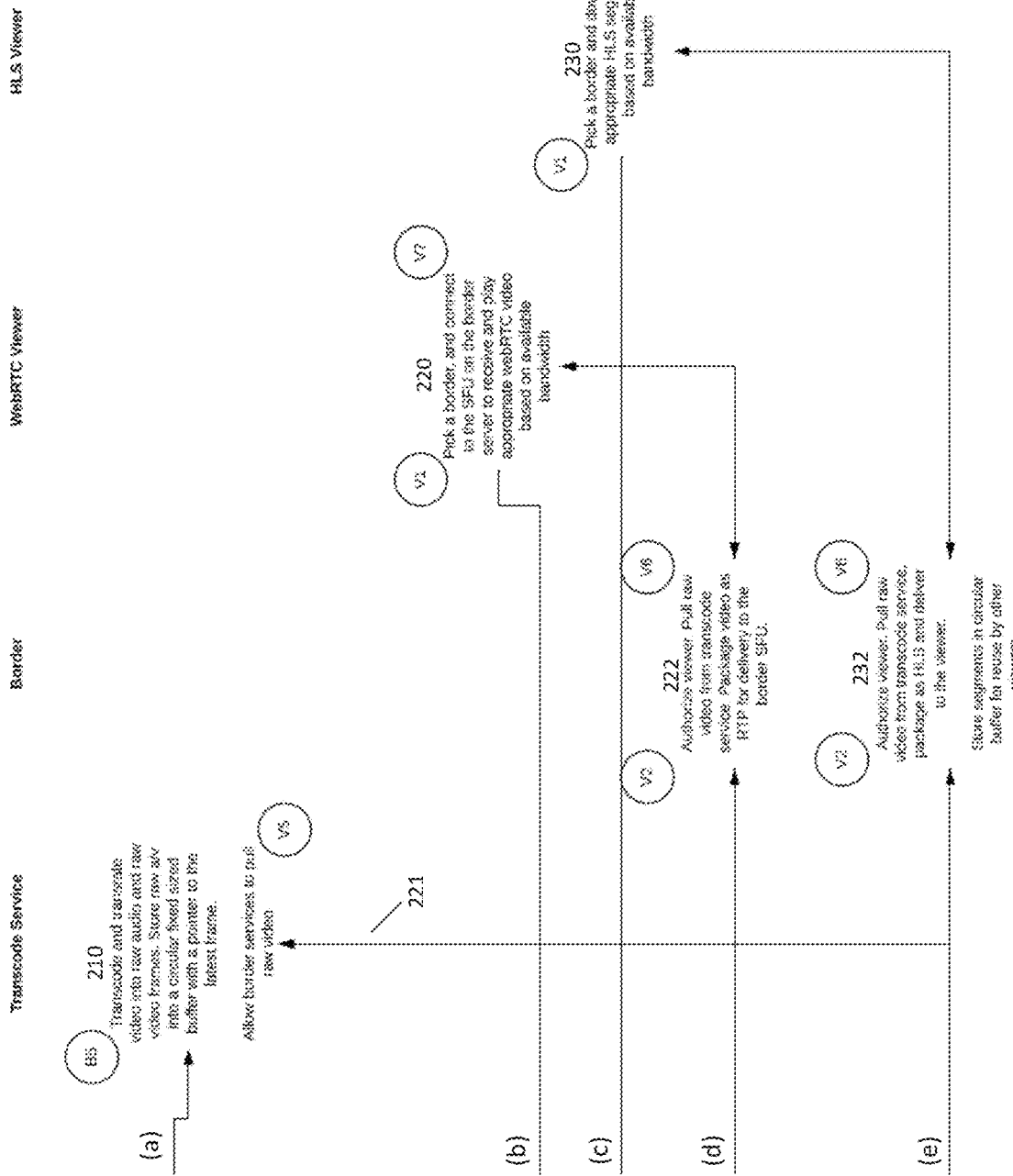

SYSTEMS AND METHODS FOR DELIVERING STREAMING CONTENT

CROSS REFERENCE TO RELATED APPLICATION

This application claims the benefit of U.S. Provisional Application No. 63/105,491, entitled "Systems and Methods for Delivering Streaming Video," filed Oct. 26, 2020, the disclosure of which is incorporated, in its entirety (including the Appendices), by this reference.

BACKGROUND

Multiuser live video streaming involves multiple users accessing a common video feed and participating in or observing an event or activity as a group. This form of entertainment and group involvement continues to significantly increase in popularity and can be accessed using several computer software applications or platforms. These include YouTube Live, Instagram Live, Facebook Gaming, and Twitch, as examples. The event or activities can be contests, games, concerts, guided tours, social meetings, educational events, etc.

A primary differentiator between live video and recorded-on-demand video with regards to the user experience is the types and extent of user interaction with the video and with each other. For example, the above-mentioned applications or platforms typically provide functionality to allow users to interact through chat, text-to-speech conversion, a variety of interactive games, a form of social-networking, and other increasingly desirable features.

Both the latency between the broadcaster (the source of the video) and each of the viewer(s), as well as the synchronization of a common experience among viewers, are important factors that can either contribute to or detract from an effective interactive experience for the users/viewers. Higher latencies create very stilted experiences for a viewer because the viewer does not see the reactions to their interactions in real time, leading to a less engaging, less enjoyable, and less productive experience. For at least this reason, applications and platforms have attempted to reduce both forms of latency (broadcaster to viewer and between viewers) to maintain and increase the number and satisfaction of their users. Reduced latency also increases user engagement which can increase advertising or sponsorship revenue.

Twitch, an interactive mainstream live platform, has shown the value of lowering latency over its years of operation. Twitch delivers video over the HTTP Live Streaming (HLS) protocol which requires the video to be processed and served in segments of at least a second long. Note that longer segments and higher buffer requirements pose fewer technical challenges but cause an increase in latency. In its earlier days, Twitch served 15 second segments and required that 3 segments be downloaded before playback, which imposed a 45 second delay. Over the years they have managed to reduce this down to as low as a 2 second delay and as a result, improved user interaction. It is believed within the industry that at 2 seconds, they have achieved the lowest realistic latency that can be achieved using the HLS protocol.

WebRTC is a protocol traditionally used to deliver peer-to-peer video for communication applications such as Apple's FaceTime, Google's Hangouts, or Zoom web conferences. It can achieve a lower latency than HLS primarily because it delivers packets (RTP) in real time instead of as segments. However, WebRTC has not yet been adopted by broadcasters and users of multiuser live streaming applications. This is believed to be due to one or more of the following factors; (1) a lack of broadcaster adoption, arising from inertia on the part of broadcasters who prefer to rely on their existing infrastructure, (2) use of WebRTC may require expensive architectural changes, and (3) use of WebRTC would involve an unintuitive system design, as a result of it being developed from communications protocols.

For example, because, WebRTC was originally created as a peer-to-peer protocol, a broadcaster who was considering basing their video streaming platform on using WebRTC would expect to need to send video data to each individual user. An alternative would be for some recipients to forward the received video to others in a network of users, although this would incur an added delay and increase the possible loss of data. Regardless, this approach does not scale properly or at least does not scale reliably or efficiently as user numbers and/or bandwidth demand increases.

Traditional live streaming approaches do not achieve sub-second latency because they package video into multi-second chunks and an application or player buffers several of them. This is mostly so that the players can be adaptive based on conventional logic; that is, they can analyze the download of large chunks of video and then adjust the playback bitrate based on the known values of the download time and size. They are adaptive in the sense that they try to play something, and if it plays easily and fast, then the playback shifts to something of relatively higher resolution; if it cannot play fast enough, then playback is shifted into relatively lower resolution (that is, it continues playing but pixelates).

Embodiments of the systems and methods described herein are directed to solving these and related problems individually and collectively.

SUMMARY

The terms "invention," "the invention," "this invention," "the present invention," "the present disclosure," or "the disclosure" as used herein are intended to refer broadly to all the subject matter described in this document, the drawings or figures, and to the claims. Statements containing these terms should be understood not to limit the subject matter described herein or to limit the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

Embodiments of the systems and methods described herein are directed to a system architecture and methods for streaming or live video that can provide sub-second video over WebRTC to viewers with a horizontally scaling architecture. In some embodiments, the system and methods described herein generate video from another source on a server and redistribute it to the client devices in a peer-to-peer architecture (with a peer established on the server). In one sense, the system and architecture are designed to deliver WebRTC to users but does not require broadcasters to change the systems and protocols they are familiar with and comfortable with using.

In some embodiments, the disclosure is directed to a method for delivering streaming audio and/or video content. In one embodiment, the method may include the following steps, stages, functions, processes, or operations:

Receive a stream of audio and/or video content from a source (e.g., a broadcaster);
  If the stream consists of only audio, then the later transcoding stage is performed on the audio and a still black frame may be inserted (or not) to represent the video content;
  If the stream consists of only video, then the later transcoding stage is performed on the video and a silent audio track may be inserted (or not) to represent the audio content;
  The format of the received stream may be either RTMP or WebRTC depending upon the format provided by the source (such as a broadcaster);
Provide the received audio and/or video content stream to a Transcoding server;
  The content stream received from a source may be provided in multiple formats, where the format generally depends upon the video and/or audio codecs used;
  The selection of the Transcoding server may depend on the result of executing load balancing logic to distribute the transcoding operation(s) for a plurality of incoming content streams among multiple servers;
  In some embodiments, the Transcoding server demultiplexes the incoming content stream into a separate audio stream and a separate video stream, decodes each of the separate audio and video streams into an intermediate format (termed a "raw" data stream format herein) from which one or more desired formats can be generated, depending upon the needs of an end user, and stores the raw format audio and/or video data frame-by-frame in a circular buffer or other data storage element;
    Note that each "piece" or section of data from either the audio or video stream is in the form of an individual frame rather than a "chunk" or multiple frames, as in conventional approaches;
    Because embodiments do not require that a chunk or multiple frames of video data be received and stored in a device buffer prior to initiating playback, the disclosed system and methods eliminates the delay resulting from the need to download that much content before it can be being consumed by an end user. This reduces the latency experienced by a user/viewer and achieves closer to a real-time distribution of content when compared to conventional approaches. This capability is particularly important in gaming and similar contexts in which primary content is supplied by a source while participants engage in chats or other exchanges of content between themselves;
  Storage of the raw format audio and/or video data in a circular buffer enables processing of individual frames in a desired sequence and/or with desired additional content, and the distribution of individual frames to a Border (distribution) server for distribution to end user devices;
    As an example, the additional content may include an advertisement, image, link, audio, or video patched into content to explain or extend the content, etc.;
  The Transcoding server sends the raw or intermediate format audio and/or video content frame-by-frame to a Border server;
    The Border server establishes a peer node on the server for distribution of the content to one or more end users;
      In some embodiments, a Border server may establish a peer connection with a viewer/user through traditional WebRTC signaling;
    The Border server may be selected based on the execution of load balancing logic;
    The Border server may multiplex the audio and/or video content received from a Transcoding server into a desired format for an end user's device;
    The Border server may re-encode the audio and/or video content received from a Transcoding server into a desired format for an end user's device, where the re-encoding is performed on a frame-by-frame basis;
    The Border server may provide the audio and/or video content received from a Transcoding server to another Border server for multiplexing and distribution, and/or for encoding and distribution to an end user/viewer;
  A user/viewer receives the audio and/or video content from a Border server frame-by-frame in a desired format and with minimal latency;
    In some embodiments, the viewer may "register" with a Border server and indicate a desired format, an application being used to view content, or other aspect of their device (such as the supported audio and/or video codecs);
    In some embodiments, the system may "discover" the features or characteristics of the end user's device and use that information to determine the desired format of the provided content.

In one embodiment, the disclosure is directed to a system for delivering streaming audio and/or video content. The system may include a set of computer-executable instructions and a processor or processors. When executed by the processor or processors, the instructions cause the processor or processors (or a device of which they are part) to perform a set of operations that implement an embodiment of the disclosed method or methods.

In one embodiment, the disclosure is directed to a set of computer-executable instructions, wherein when the set of instructions are executed by a processor or processors, the processor or processors (or a device of which they are part) perform a set of operations that implement an embodiment of the disclosed method or methods.

In some embodiments, the systems and methods described herein may provide audiovisual content distribution services through a SaaS or multi-tenant platform. The platform provides access to multiple entities (such as content sources), each with a separate account and associated data storage. Each account may correspond to a content source, set of sources, or organization, for example. Each account may access one or more services, a set of which are instantiated in their account and which implement one or more of the methods or functions described herein.

Other objects and advantages of the systems and methods described will be apparent to one of ordinary skill in the art upon review of the detailed description and the included figures. Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the forms disclosed. Rather, the present disclosure covers all modifications, equivalents, and alternatives falling within the scope of the appended claims.

BRIEF DESCRIPTION OF THE DRAWINGS

Embodiments of the invention in accordance with the present disclosure will be described with reference to the drawings, in which:

FIGS. 2(a) and 2(b) are diagrams illustrating a workflow for an example use case of the systems and methods described herein, in accordance with some embodiments;

Note that the same numbers are used throughout the disclosure and figures to reference like components and features.

DETAILED DESCRIPTION

Figure 1:
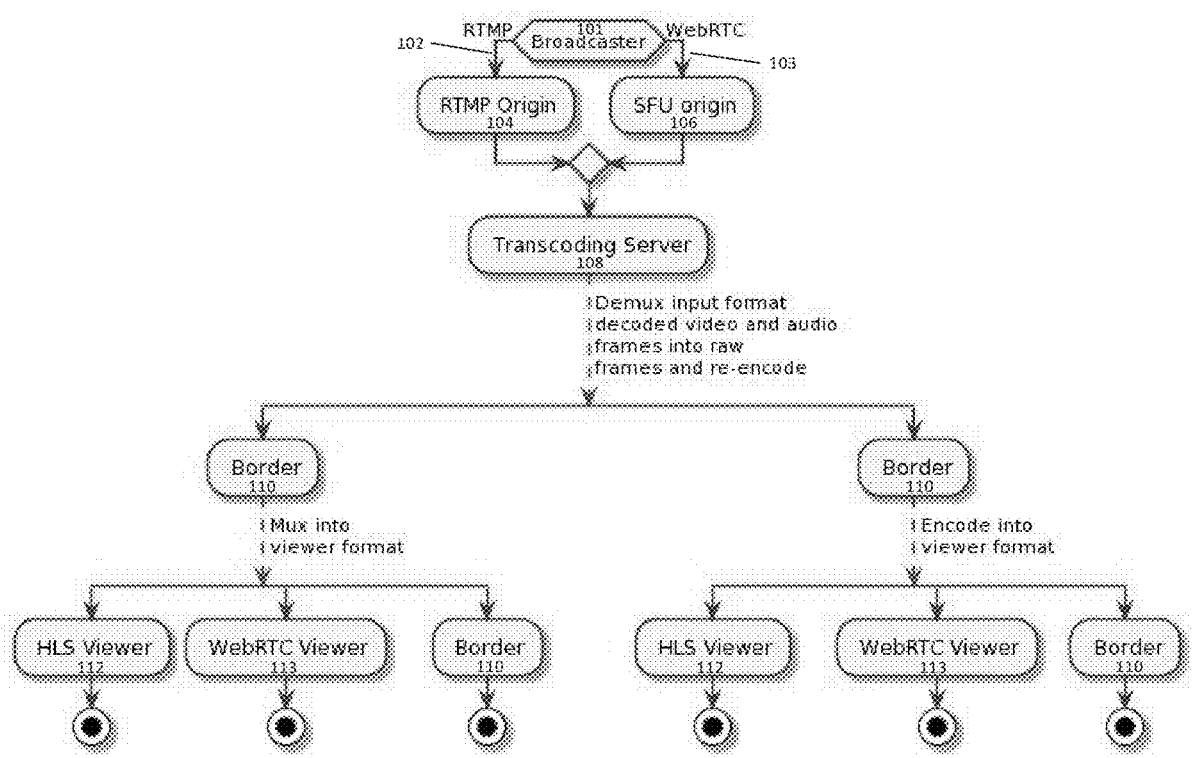
FIG. 1 is a diagram illustrating an example of a system architecture for a streaming content distribution network, in accordance with some embodiments.

The subject matter of embodiments of the present disclosure is described herein with specificity to meet statutory requirements, but this description is not intended to limit the scope of the claims. The claimed subject matter may be embodied in other ways, may include different elements or steps, and may be used in conjunction with other existing or later developed technologies. This description should not be interpreted as implying any required order or arrangement among or between various steps or elements except when the order of individual steps or arrangement of elements is explicitly noted as being required.

Embodiments of the disclosure will be described more fully herein with reference to the accompanying drawings, which form a part hereof, and which show, by way of illustration, exemplary embodiments by which the disclosure may be practiced. The disclosure may, however, be embodied in different forms and should not be construed as limited to the embodiments set forth herein; rather, these embodiments are provided so that this disclosure will satisfy the statutory requirements and convey the scope of the disclosure to those skilled in the art.

Among other things, the present disclosure may be embodied in whole or in part as a system, as one or more methods, or as one or more devices. Embodiments of the disclosure may take the form of a hardware implemented embodiment, a software implemented embodiment, or an embodiment combining software and hardware aspects. For example, in some embodiments, one or more of the operations, functions, processes, or methods described herein may be implemented by one or more suitable processing elements (such as a processor, microprocessor, CPU, GPU, TPU, controller, etc.) that is part of a client device, server, network element, remote platform (such as a SaaS platform), an "in the cloud" service, or other form of computing or data processing system, device, or platform.

The processing element or elements may be programmed with a set of executable instructions (e.g., software instructions), where the instructions may be stored on (or in) one or more suitable non-transitory data storage elements. In some embodiments, the set of instructions may be conveyed to a user through a transfer of instructions or an application that executes a set of instructions (such as over a network, e.g., the Internet). In some embodiments, a set of instructions or an application may be utilized by an end-user through access to a SaaS platform or a service provided through such a platform.

In some embodiments, one or more of the operations, functions, processes, or methods described herein may be implemented by a specialized form of hardware, such as a programmable gate array, application specific integrated circuit (ASIC), or the like. Note that an embodiment of the inventive methods may be implemented in the form of an application, a sub-routine that is part of a larger application, a "plug-in", an extension to the functionality of a data processing system or platform, or other suitable form. The following detailed description is, therefore, not to be taken in a limiting sense.

Embodiments of the systems, apparatuses, and methods described herein are directed to providing streaming audio and/or video content through an architecture that can ingress (intake) RTMP format content and egress (output and distribute) WebRTC format content efficiently by generating a client-side peer and client-side content on a server. It is believed that a combination of the requirements of this change in approach and architectural design, and the potential cost, has prevented adoption of WebRTC for delivering real-time video streams. This in turn has prevented conventional approaches to providing streaming content from being able to reduce latency to a degree desired by end users for gaming and inter-user communications, among other desired experiences or use cases.

In some embodiments, the disclosed architecture includes a middle data/content processing layer that comprises two data or content processing elements, termed adapters. The first adapter (referred to as a Transcoding server herein) converts an incoming video stream (e.g., RTMP or RTP forwarded from a source using WebRTC) into an intermediate video format and stores the content in that format. This intermediate format may be termed "raw" video herein, as it consists of individual frames or a single frame container instead of being composed of chunks (as would occur conventionally with MP4, MP4 Fragments, or HLS chunks). In some embodiments, a system includes a circular buffer of frames that can be used to compose and deliver content in multiple formats or sequences. The stored raw data is encoding agnostic, although key frames and p frames may be stored in the circular buffer. Note that this approach differs from conventional approaches as it does not directly convert incoming video into a desired final format but instead utilizes an intermediate stage in which the audio and video content is stored as frames that may be accessed in a desired order and processed in a desired manner.

A second adapter (referred to as a Border server herein) converts the raw audio and/or video content into a desired form of output stream for the viewer (e.g., WebRTC or HLS, although other formats or protocols may be supported and used). With the described architecture and processing approach, broadcasters (i.e., content sources) can send the service platform an audio and/or video stream or packets in their preferred format or in compliance with their desired protocol, and the platform is able to convert or otherwise process the received content to enable users/viewers to view the content with sub-second latency. This permits end users to view or participate in a game or event and interact with each other in what is perceived to be real-time or very close to it, and provides an improvement compared to conventional approaches.

Embodiments enable the distribution of audio and/or video content with significantly lower latency than conventional approaches. This provides substantially real-time viewing or listening capabilities to a user or users, and also substantially real-time interaction capabilities between users. The reduction in latency prevents a loss (or as severe or noticeable a loss) of synchronization between each user and the content server as well as between users compared to conventional approaches. This enhances both the content consumption experience of each user and the interactive experience between users.

Conventional approaches differ from the proposed system and methods in several aspects. One reason is that the architectural changes needed to ingress and egress WebRTC alongside traditional HLS requires building out a specialized content delivery network (CDN) and would effectively double the expense required to deliver video using conventional approaches. This presents a financial as well as a system management and administration obstacle to adoption. Finally, a design to ingress and egress both HLS and WebRTC is unintuitive to conventional system architects because WebRTC has traditionally been considered only as a peer-to-peer solution and has not been used as part of an overall system in the manner described herein.

In contrast, embodiments generate what has traditionally been viewed as a client-side peer and client-side content on a server node. It is believed that a combination of this change in architectural design and the potential cost has prevented adoption of WebRTC for delivering real-time video streams.

Another possible reason for conventional approaches not using WebRTC to facilitate content streaming may be because traditionally, broadcasting software delivers video over RTMP, which "guarantees" delivery of video at a configurable bitrate, sometimes by resending unacknowledged packets. Some content sources may prefer not to adopt a WebRTC based mechanism for delivering streaming content because of the possibility of packet loss, in addition to the lack of control and the necessity of switching platforms.

In contrast, the architecture and approach described herein acknowledges the benefits of RTMP for use by content sources but provides the benefits of WebRTC to end-users. In some embodiments, using WebRTC in this manner can achieve sub-second latency and provide a better adaptive experience by delivering the smallest sized packets of video on demand and using UDP to analyze packet drop for a more satisfactory end-user experience.

FIG. 1 is a diagram illustrating an example of a system architecture 100 for a streaming content distribution network, in accordance with some embodiments. In some embodiments, the system architecture includes the following servers or nodes as part of a content (audio, video, or both) distribution network:

a RTMP Origin Server(s) 104: A web server capable of ingressing (i.e., receiving as an input) RTMP streams 102 from a source (such as broadcaster 101) and forwarding the RTMP stream to a transcoding server or servers 108;

WebRTC Origin Server(s): Represented in the figure by a selective forwarding unit (SFU) 106 or other server capable of ingressing WebRTC streams 103 from a source (such as broadcaster 101) and forwarding the organized RTP video to a transcoding server or servers 108;

As part of the WebRTC specification, the origin server may monitor the received data and request missing data from the source;

Transcoding Server(s) 108: Servers capable of receiving either RTP or RTMP streams and decoding that data into an intermediate format (termed "raw" audio and/or video content herein); and Border Server(s) 110: Servers that retrieve raw format data from the Transcoding server(s) 108 or other Border server(s), convert it into HLS or WebRTC (as suggested by HLS Viewer 112 and WebRTC Viewer 113), and deliver it to the end user/viewer or to another Border server for distribution to end users;

As suggested by the figure, the conversion may involve one or both of multiplexing and re-encoding operations;

A Border Server may contain an SFU.

In some embodiments, the functions, operations, or data processing capabilities performed by the indicated elements or components of the architecture may include:

First adapter (represented by Transcoding Server 108 Components)

Inspect incoming RTMP or RTP video for codecs, frame height, frame width, frames per second, and other relevant audio and video data;

Using libavcodec (or another similar or equivalent library of codecs for decoding and encoding), write "raw" audio into a circular buffer and maintain a pointer to the most recent audio packets; and Using libavcodec (or another similar or equivalent library of codecs for decoding and encoding) for each desired resolution (as may be determined by viewer/user bandwidth and/or device limitations), write "raw" video frames into a circular buffer and maintain a pointer to the most recent video packets;

Second adapter (represented by Border Server 110 Components)

Establish a peer connection between an SFU in the Border server 110 and the end user/viewer;

Establish a connection between the Border server 110 and the Transcoding server 108 to receive a mirror of the raw data prepared by the Transcoding server for purposes of optimizing the user experience, as it is typically advantageous to mirror the raw data and then have the Border server do what it needs to do to process and deliver it in a desired format to the end user;

1. an alternative would be viewing video directly from a transcoding server; however, this presents a significantly higher risk to the system because viewers are volatile and can negatively impact the transcoding server—if a transcoding server crashes, it impacts more users and is more difficult to recover from;
2. A second alternative would be mirroring all resolutions packaged in all codecs and all formats; however, this results in increased network activity and traffic, and is unlikely to be scalable; and Based on the end user/viewer requirements, convert the raw data into HLS to be delivered over HTTP or into RTP packets to be delivered to the end user/viewer over WebRTC.

In some embodiments, the raw data or converted raw data may be sent to another Border server for distribution to an end-user.

From one perspective the system, apparatuses, and methods described herein operate to receive a content stream in a broadcaster's or source's preferred format, convert it to an intermediate format (e.g., raw audio and/or video), generate a WebRTC peer on a server, convert the raw format content into a desired format for a user's device, and provide the content through the peer to the user's device in the desired format. Further, the egress interface of the Transcoding server enables a content consumer to consume the re-encoded signal using different network protocols, transport protocols and muxing, e.g., FLV over RTMP over TCP or RTP over UDP.

Figure 2A:
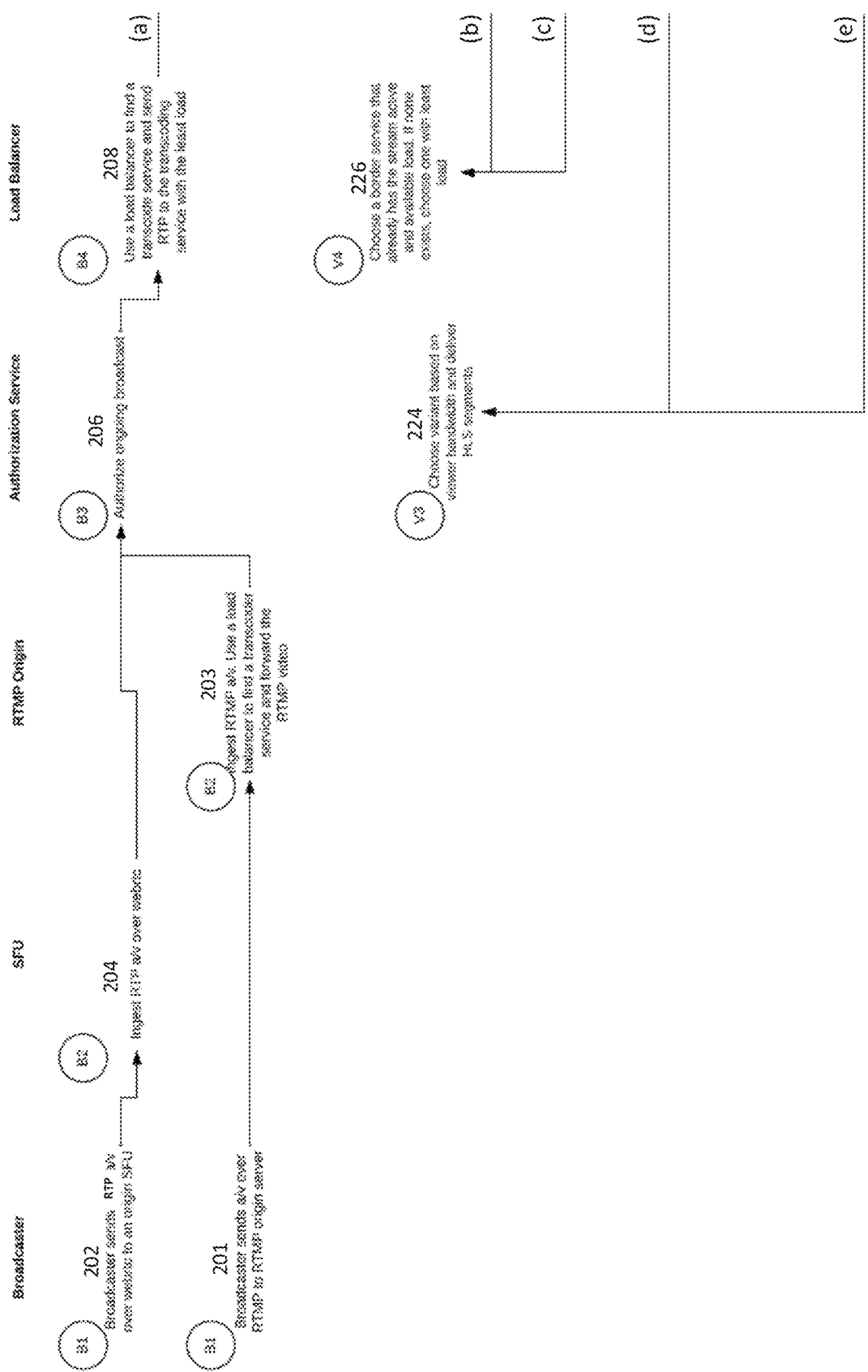

FIGS. 2(a) and 2(b) are diagrams illustrating a workflow 200 for an example use case of the systems and methods described herein, in accordance with some embodiments. As shown in the figure, in one embodiment, the events or data processing operation(s) that may occur at each stage include the following (the B1 to B5 labels in the figures represent Broadcaster events and the V1 to V7 labels in the figures represent viewer related "services" involved in the audio and/or video data processing and distribution):

Broadcaster Flow for WebRTC

Indicated as "Broadcaster" in the Figure, Representing a Source of Video

B1: Broadcaster sends RTP audio and/or video content (indicated as a/v) over WebRTC to an origin SFU (as suggested by step or stage 202);
B2: At the SFU, ingest RTP content over WebRTC. Convert RTP to RTMP (step or stage 204);
B3: Authorize ongoing broadcast (e.g., via an authorization API call)—this step or process queries the application service to determine if the user that is streaming is allowed to stream the content, and if they are not, it ends the session (step or stage 206);
B4: Assuming the user is allowed to stream the content, use a load balancer to find a transcoding server with the least load (or one that is more desirable for another reason) to forward the video to (step or stage 208);
B5: Transcode and transrate the received video into raw audio and raw video frames. Store the raw frames in a circular buffer with a pointer to the latest frame (step or stage 210);

Broadcaster Flow for RTMP

B1: Broadcaster sends audio and/or video content over RTMP to a RTMP origin server (step or stage 201);
B2: At the RTMP server, ingest RTMP content. Use a load balancer to find a transcoding server and forward the RTMP video (step or stage 203);
B3: Authorize ongoing broadcast—this step or process queries the application service to determine if the user that is streaming is allowed to stream the content, and if they are not, it ends the session (step or stage 206);
B4: Assuming the user is allowed to stream the content, use a load balancer to find a transcoding server with the least load (or more desirable for another reason) to forward the video to (step or stage 208);
B5: Transcode and transrate the received video into raw audio and raw video frames. Store the raw frames in a circular buffer with a pointer to the latest frame (step or stage 210).

User/Viewer Flow for WebRTC

V1: Pick a Border server, typically using a load balancer and connect to the SFU on the Border server to receive and play appropriate WebRTC video based on available bandwidth (step or stage 220);
for example, a global load balancer may be used to identify a SFU that is geographically (or network topology-wise) close and has a current (or expected) load below a threshold value, where the threshold value is characterized by a CPU and egress bandwidth;
V2: Authorize viewer. Pull raw video from transcoding server (as suggested by path 221). Create a peer connection with the user and package and deliver video as RTP over WebRTC (step or stage 222);
V3: Identify the capabilities of the user device in terms of audio/video codex support and bandwidth (step or stage 224);
V4: Choose a Border server that has the stream active and has available load capacity. If none exists, choose one with the least load (step or stage 226);
V5: Allow Border server(s) to pull raw video over RTMP (as suggested by path 221) from a Transcoding server.

Viewer for HLS

V1: Pick a Border server, and download appropriate HLS segments based on the available bandwidth (step or stage 230);
V2: Authorize viewer. Pull raw video from transcoding server, package as HLS and deliver to the viewer (step or stage 232);
V3: Identify the capabilities of the user device in terms of audio/video codex support and bandwidth (step or stage 224);
V4: Choose a Border server that has the stream active and has available load capacity. If none exists, choose one with the least load (step or stage 226);
V5: Allow Border server(s) to pull raw video over RTMP (as suggested by path 221) from a Transcoding server.
V6: represents video delivered over HLS or WebRTC to the end user.
V7: represents a video player capable of playing HLS or WebRTC that plays the video.

Figure 3:
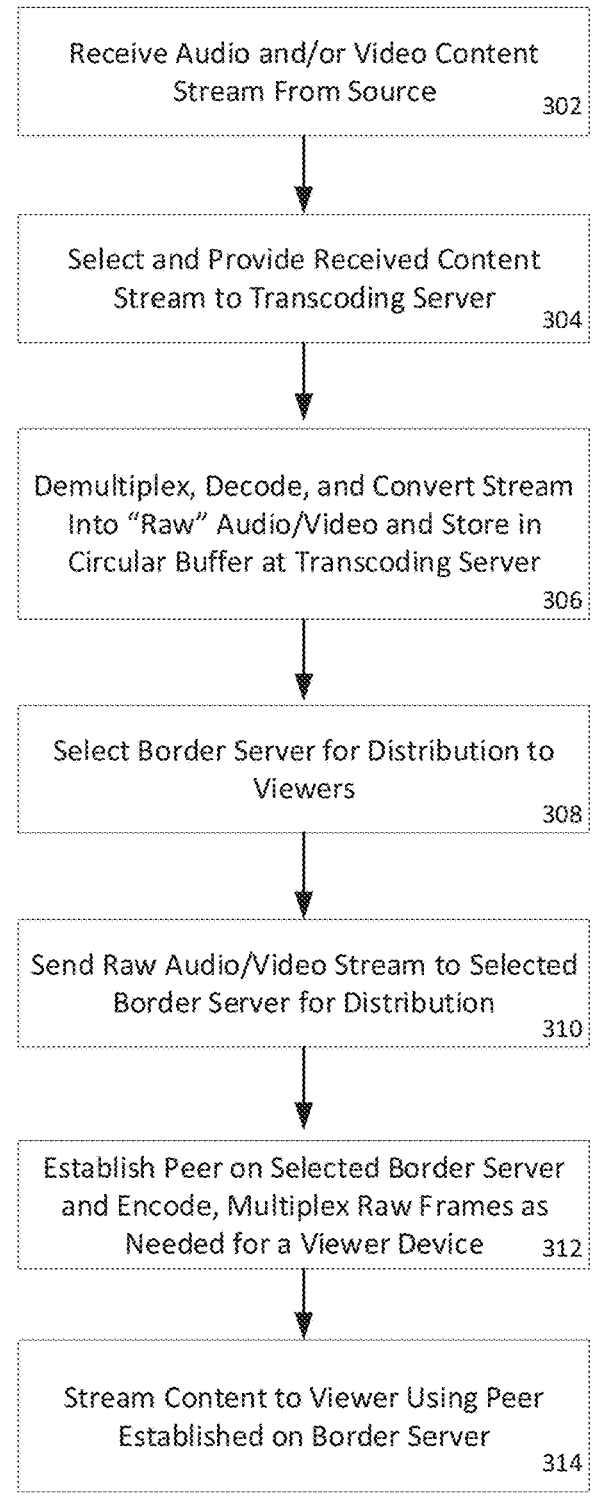
FIG. 3 is a flowchart or flow diagram illustrating a method, process, operation, or function for providing streaming video from a broadcaster or source to a plurality of viewers on a substantially real-time basis, in accordance with some embodiments.

FIG. 3 is a flowchart or flow diagram illustrating a method, process, operation, or function 300 for providing streaming video from a broadcaster or source to a plurality of viewers on a substantially real-time basis, in accordance with some embodiments. As shown in the figure, in one embodiment, a content stream is received from a source (as suggested by step or stage 302). The content stream may comprise audio and/or video content. The source may comprise a broadcaster or content producer. In one embodiment, the content may be received from a RTMP origin server. In one embodiment the content may be received from a SFU origin server.

As mentioned, if the content stream consists of only audio, then the later transcoding stage is performed on the audio and a still black frame may be inserted (or not) to represent the video content. If the content stream consists of only video, then the later transcoding stage is performed on the video and a silent audio track may be inserted (or not) to represent the audio content.

Next, the content stream is provided to a Transcoding server (as suggested by step or stage 304). As mentioned, selection of a Transcoding server may depend on the result of executing load balancing logic to distribute the transcoding operation(s) for a plurality of incoming content streams among multiple servers. In some embodiments, the Transcoding server may demultiplex the incoming content stream into a separate audio stream and a separate video stream, decode each of the separate audio and video streams into an intermediate format (termed a "raw" data stream herein), so that the audio and video can later be re-encoded and packaged into the desired codecs and format, where the re-encoding is performed on a frame-by-frame basis and the desired format may be determined by the end-user's device requirements.

In some embodiments, the end user device requirements are provided by use of a handshake protocol in which a device browser identifies a support matrix or similar data. In some embodiments, the re-encoded data is stored in a circular buffer to enable processing of individual frames in a desired sequence and/or with desired additional content, and the distribution of individual frames to end user devices (as suggested by step or stage 306). In one embodiment, such additional content may comprise one or more of an image overlay, a sound notification, a sound effect, an advertisement, a link to enable a purchase or access to other information, text, or an embedded image, as examples. The additional content may be supplied as part of a gaming experience, a video conferencing experience, or other interactive experience.

The Transcoding server selects a Border server and sends the re-encoded audio and video content frame-by-frame to the selected Border server (as suggested by steps or stages 308 and 310). The Border server establishes a peer node on the server for distribution of the content to one or more end users (as suggested by step or stage 312). In some embodiments, a SFU in a Border server may function as a peer for delivery of data over WebRTC. In these embodiments, a Border server uses a SFU to establish a peer connection to an end user to send video over WebRTC. In some embodiments, a Border server may establish a peer connection with a viewer/user through traditional WebRTC signaling. As mentioned, the Border server may be selected based on the execution of load balancing logic.

In some embodiments, the Border server may multiplex the received audio and video content into a desired format for an end user's device. In some embodiments the Border server may encode the audio and video content into a desired format for an end user's device. In some embodiments, the Border server may provide the received audio and video content to another Border server for multiplexing and distribution, and/or for encoding and distribution to an end user/viewer.

Next, a user/viewer receives the audio and/or video content from a Border server frame-by-frame in a desired format and with minimal latency (as suggested by step or stage 314). In some embodiments, a user/viewer may "register" with a Border server and indicate a desired format, an application being used to view content, or other aspect of their device (such as the supported audio and/or video codecs). In some embodiments, the system may "discover" the features or characteristics of an end user's device and use that information to determine the desired format of the provided content.

Figure 4:
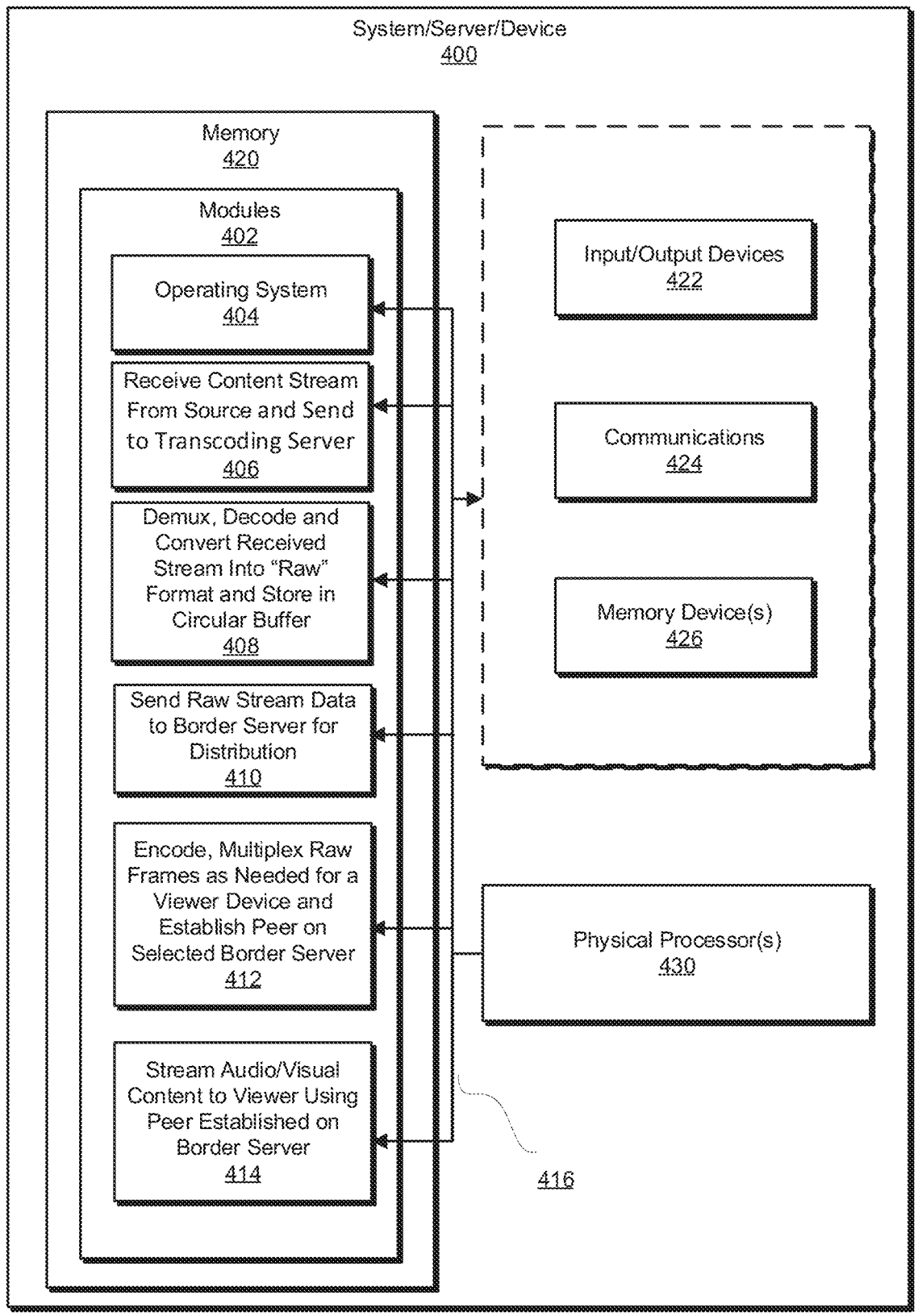
FIG. 4 is a diagram illustrating elements or components that may be present in a computer device, server, or system configured to implement a method, process, function, or operation in accordance with some embodiments.

FIG. 4 is a diagram illustrating elements or components that may be present in a computer device, server, or system 400 configured to implement a method, process, function, or operation in accordance with some embodiments. As noted, in some embodiments, the described system and methods may be implemented in the form of an apparatus that includes a processing element and a set of executable instructions. The executable instructions may be part of a software application and arranged into a software architecture. In general, an embodiment of the invention may be implemented using a set of software instructions that are designed to be executed by a suitably programmed processing element (such as a GPU, TPU, CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language.

As mentioned, each module may contain instructions which when executed by a programmed processor cause an apparatus (such as a server or client device) to perform the specific function or functions. The apparatus may be one or both of a client device or a remote server or platform. A module may contain instructions that are performed by a client device, a server or platform, or by both.

As shown in FIG. 4, system 400 may represent a server or other form of computing or data processing device. Modules 402 each contain a set of executable instructions, where when the set of instructions is executed by a suitable electronic processor (such as that indicated in the figure by "Physical Processor(s) 430"), system (or server or device) 400 operates to perform a specific process, operation, function, or method. Modules 402 may contain one or more sets of instructions for performing a method or function described with reference to the Figures, and the descriptions of the functions and operations provided in the specification. The modules may include those illustrated but may also include a greater number or fewer number than those illustrated. Further, the modules or the computer-executable instructions that are contained in a module or modules may be executed by the same processor or by more than a single processor.

Modules 402 are stored in a memory 420, which typically includes an Operating System module 404 that contains instructions used (among other functions) to access and control the execution of the instructions contained in other modules. The modules 402 in memory 420 are accessed for purposes of transferring data and executing instructions by use of a "bus" or communications line 416, which also serves to permit processor(s) 430 to communicate with the modules for purposes of accessing and executing a set of instructions. Bus or communications line 416 also permits processor(s) 430 to interact with other elements of system 400, such as input or output devices 422, communications elements 424 for exchanging data and information with devices external to system 400, and additional memory devices 426.

Each application module or sub-module may correspond to a specific function, method, process, or operation that is implemented by the module or sub-module. Each module or sub-module may contain a set of computer-executable instructions that when executed by a programmed processor or processors cause the processor or processors (or a device or devices in which they are contained) to perform the specific function, method, process, or operation. Such function, method, process, or operation may include those used to implement one or more aspects of the disclosed system and methods, such as for:

Receive Content Stream From Source and Send to Transcoding Server Module 406 may contain instructions that when executed perform a process to ingress or intake an audio and/or video stream (or a combined audio/video stream) from a source or broadcaster and provide it to a selected Transcoding server. The incoming stream may be in a format or conform with a protocol chosen by the source, including but not limited to RTMP, HLS, or WebRTC;
  a content stream containing both audio and video may need to be demultiplexed into separate audio and video streams prior to further processing;

Demux, Decode and Convert Received Stream Into "Raw" Format and Store in Circular Buffer Module 408 may contain instructions that when executed perform a process to demultiplex (if needed and not already performed), decode, and convert an incoming audio and/or video stream into a raw format (or other standard or intermediate format) using a Transcoding server and to store the resulting frames in a circular buffer. In some embodiments:
  the incoming content may be transmitted over TCP or UDP and may be encoded using different standards, such as h.264, VP8, AAC, OPUS and different transport protocols, such as RTMP over TCP, HTTP over TCP, or RTP over UDP;
  the received content may be stored in a circular shared memory buffer on a frame-by-frame basis, with each frame having a unique timestamp;
  the received content may be converted to a "raw" format which is stored in a secondary shared memory circular buffer;
  the raw format content may then be compressed, scaled, rotated, mixed with other content, and re-encoded using a standard encoding (e.g., h.264, VP8, AAC, OPUS, etc.) then stored in a third shared memory circular buffer;

Send Raw Stream Data to Border Server for Distribution Module 410 may contain instructions that when executed perform a process to provide the raw audio and/or video (in the format of a set of single frame containers) from a Transcoding server to a distribution (Border) server, where it will be converted to a desired format and in accordance with a desired protocol for an end user or users and distributed to viewers;

Encode, Multiplex Raw Frames as Needed for a Viewer Device and Establish Peer on Selected Border Server Module 412 may contain instructions that when executed perform a process to encode and/or multiplex the received raw format frames from the Transcoding server as needed for a viewer or viewers device(s) and create a peer as would typically be used for a peer-to-peer distribution network on the distribution (Border) server, typically by using an SFU;

Stream Audio/Visual Content to Viewer Using Peer Established on Border Server Module 414 may contain instructions that when executed perform a process to stream the audio and/or video to one or more viewers using the WebRTC protocol or format (or another format and transport protocol as desired by an end user's device) while using the established peer as the source.

Embodiments of the system and methods described herein can provide sub-second latency audio and/or video content over WebRTC to viewers with a horizontally scaling architecture (that is, one that does not impose increased latency or other technical disadvantages as the number of servers and users increases). Horizontal scaling enables servers to be added almost without limit as "siblings" to deliver the same content to a user without having a significant negative impact on the delivery of the content.

This is in contrast to conventional live streaming approaches which do not achieve sub-second latency because they package video into multi-second chunks and a user's player then buffers several of them before playback. This is done so that the players can be adaptive based on conventional logic; that is, they can analyze the download of large chunks of video and then adjust the playback bitrate based on the known values of the download time and size. If content plays easily and quickly, then the playback shifts to something of relatively higher resolution; if the content cannot play fast enough, then playback is shifted to a relatively lower resolution (that is, it continues playing but pixelates).

In some embodiments, the combination of the system and methods described herein receives audio and/or video content from a source, processes the received content on a server (e.g., the transcoding server) and redistributes it to the client devices in a peer-to-peer architecture (with a peer established on a Border server). In one sense, the system and architecture are designed to deliver WebRTC to users, but do not require sources (e.g., broadcasters) to change the systems and protocols they are familiar with and comfortable using. In some cases, this allows a content source to continue broadcasting using RTMP while obtaining the benefits of a reduced latency distribution to a large set of content consumers. Further, the shared memory circular buffer allows a process to consume data directly from memory at different points of the data processing pipeline (i.e., encoded source, raw data, re-encoded data) without pre-integration with the producer of the data. As additional examples of the benefits provided, an embodiment of the system and methods may:
  enable broadened support for reduced latency among many users;
  broaden support to users with more than one bandwidth by using WebRTC with additional transcoding to multiple bitrates;
  broaden support to more devices by using WebRTC with additional transcoding to varying codecs;
  broaden support to more devices by using WebRTC with additional transcoding to different streaming protocols, such as HLS;
  broaden support to many additional users by using WebRTC with horizontally scalable Border servers; and enable transrated versions of the content to be served over WebRTC, and stream multiplexing (content synchronization from discontinuous streams, multiple video streams, etc.,), where transrating refers to a process by which video files and audio files are converted to a reduced bit rate while maintaining the original media format to reduce the required storage space.

Figure 5:
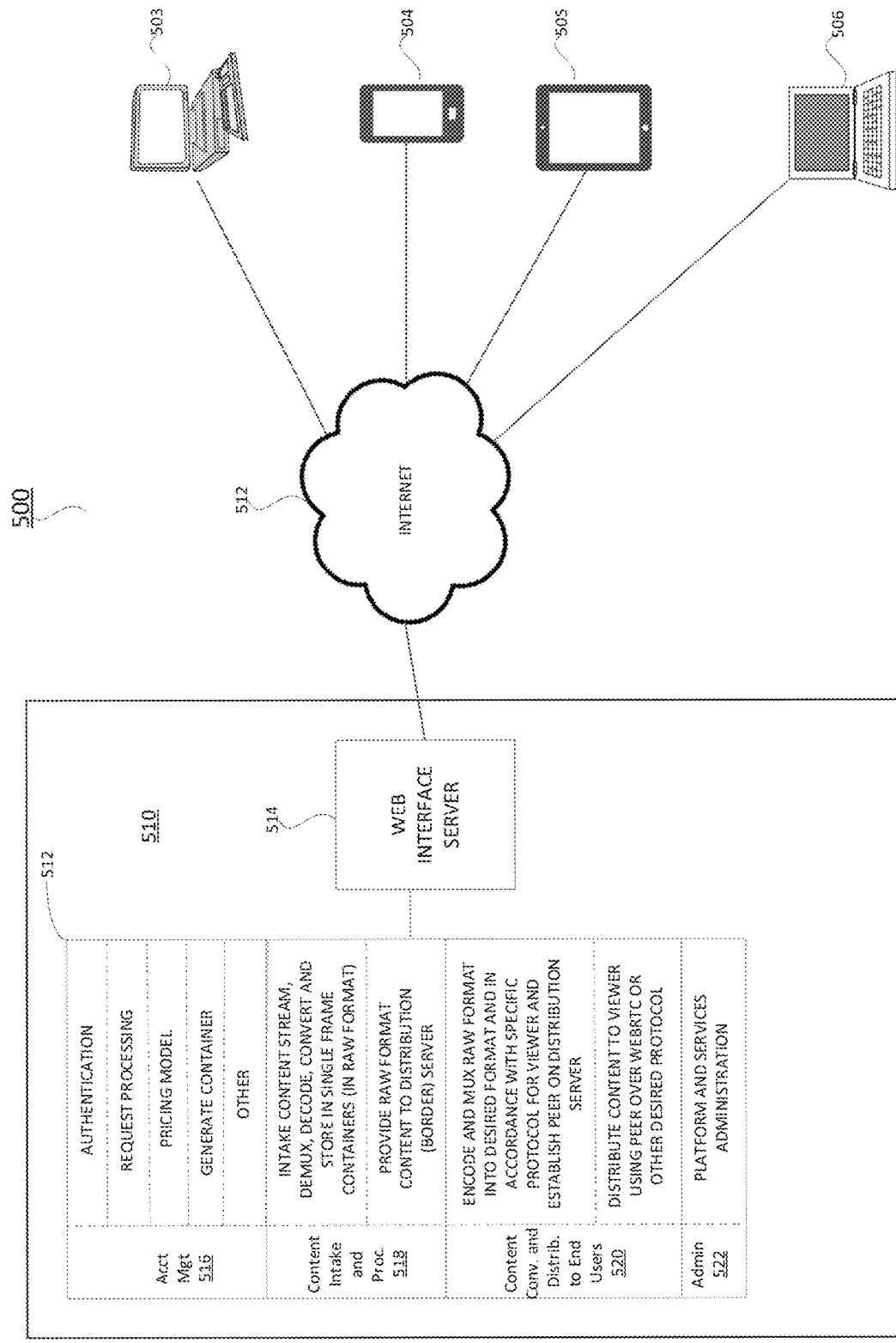
FIGS. 5-7 are diagrams illustrating an architecture for a multi-tenant or SaaS platform that may be used in implementing some embodiments of the systems and methods described herein.
Figure 6:
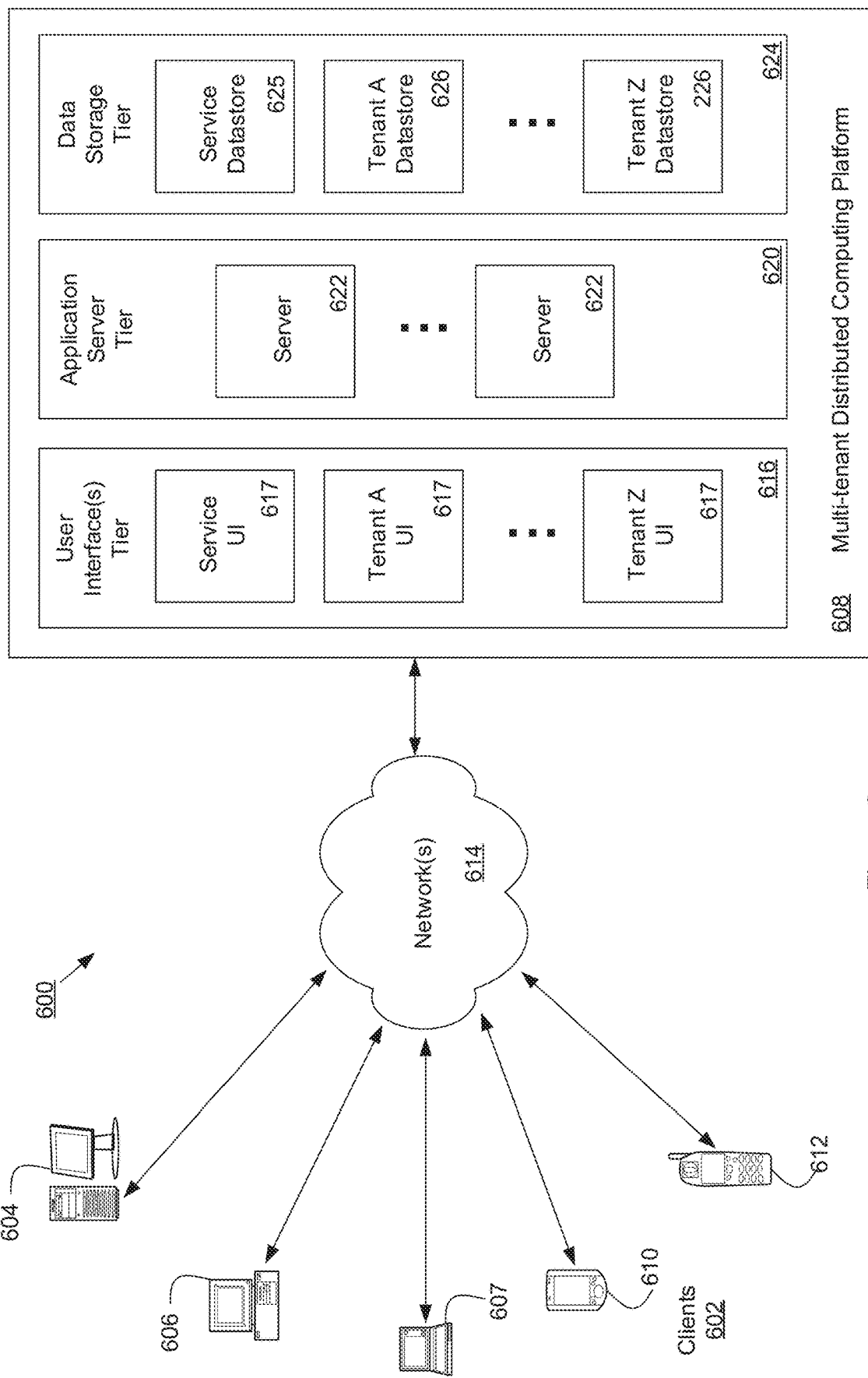
Figure 7:
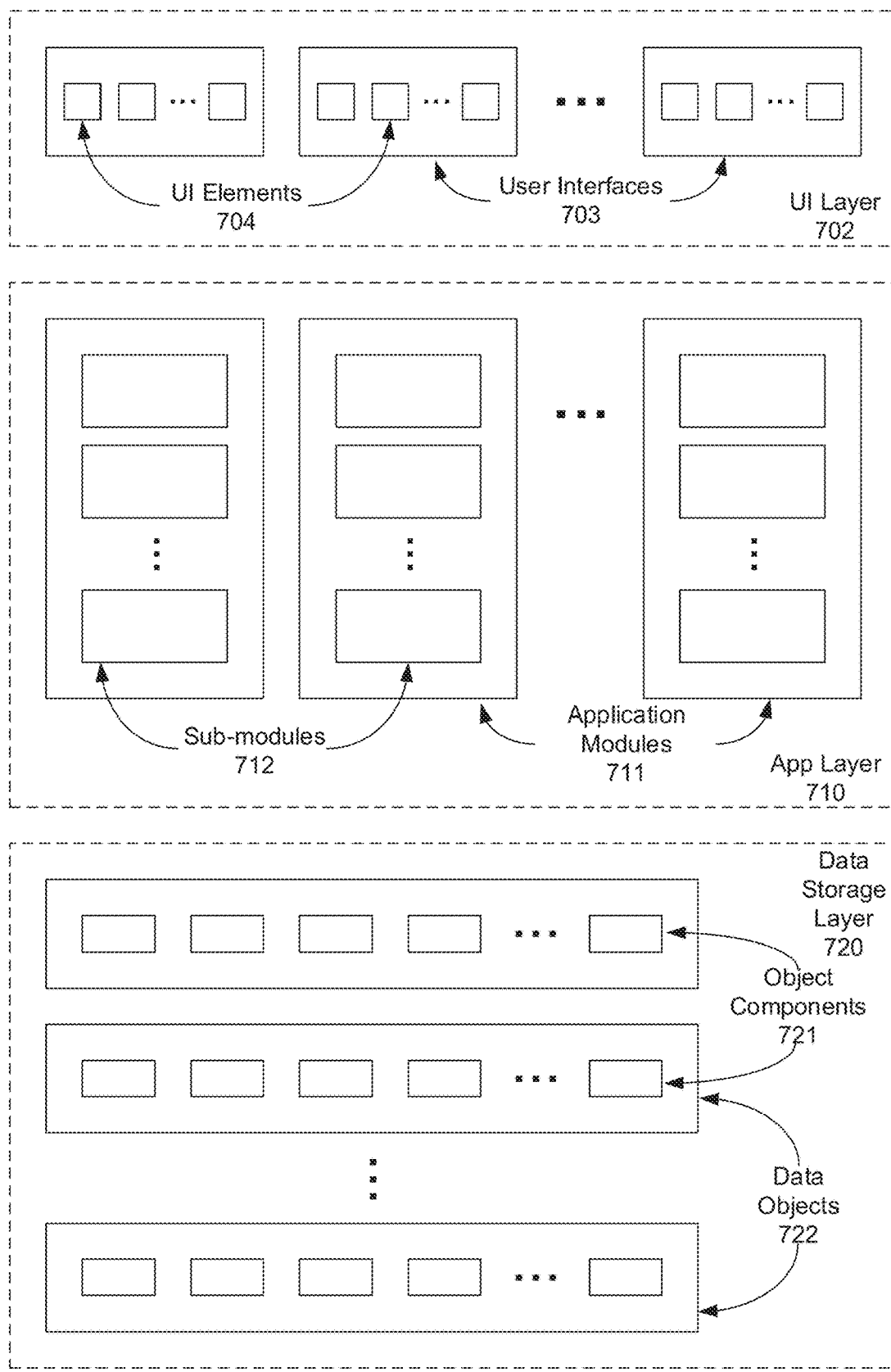

In some embodiments, the functionality and services provided by the system and methods described herein may be made available to multiple users by accessing an account maintained by a server or service platform. Such a server or service platform may be termed a form of Software-as-a-Service (SaaS). FIG. 5 is a diagram illustrating a SaaS system in which an embodiment may be implemented. FIG. 6 is a diagram illustrating elements or components of an example operating environment in which an embodiment may be implemented. FIG. 7 is a diagram illustrating additional details of the elements or components of the multi-tenant distributed computing service platform of FIG. 6, in which an embodiment may be implemented.

In some embodiments, the content processing and distribution system or service described herein may be implemented as micro-services, processes, workflows, or functions performed in response to the submission of an initial audio/video stream. The micro-services, processes, workflows, or functions may be performed by a server, data processing element, platform, or system. In some embodiments, the content processing and distribution services may be provided by a service platform located "in the cloud". In such embodiments, the platform is accessible through APIs and SDKs. The content processing and distribution services may be provided as micro-services within the platform. The interfaces to the micro-services may be defined by REST and GraphQL endpoints. An administrative console may allow users or an administrator to securely access the underlying request and response data, manage accounts and access, and in some cases, modify the processing workflow or configuration.

Note that although FIGS. 5-7 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide content processing and distribution services, such as those described herein. Although in some embodiments, a platform or system of the type illustrated in FIGS. 5-7 may be operated by a 3$^{rd}$ party provider to provide a specific set of services and applications, in other embodiments, the platform may be operated by a provider and a different business may provide the applications or services for users through the platform.

FIG. 5 is a diagram illustrating a system 500 in which an embodiment may be implemented or through which an embodiment of the content processing and distribution services described herein may be accessed. In accordance with the advantages of an application service provider (ASP) hosted business service system (such as a multi-tenant data processing platform), users of the services described herein may comprise individuals, businesses, stores, organizations, etc. A broadcaster or content source may access the content processing services using any suitable client, including but not limited to desktop computers, laptop computers, tablet computers, scanners, smartphones, etc. In general, any client device having access to the Internet may be used upload an audio and/or video stream to the platform for processing. Sources interface with the service platform across the Internet 512 or another suitable communications network or combination of networks. Examples of suitable client devices include desktop computers 503, smartphones 504, tablet computers 505, or laptop computers 506.

Content processing and distribution system 510, which may be hosted by a third party, may include a set of audio and/or video processing (including one or more of encoding, decoding, format and protocol changes) and distribution services 512 and a web interface server 514, coupled as shown in FIG. 5. It is to be appreciated that either or both of content processing and distribution services 512 and web interface server 514 may be implemented on one or more different hardware systems and components, even though represented as singular units in FIG. 5. Content processing and distribution services 512 may include one or more functions or operations for the intake, encoding, decoding, storing, reformatting, and distributing in accordance with a specific protocol, or other processing of content.

As examples, in some embodiments, the set of content processing and distribution applications, functions, operations or services made available through the platform or system 510 may include:
  account management services 516, such as (where some of the following may be optional)
    a process or service to authenticate a source wishing to submit an audio and/or video stream (or combined content stream) for processing and distribution;
    a process or service to receive a request for processing and distribution of an audio and/or video stream and prepare the source account for delivery of those services;
    a process or service to generate a price for the requested processing and distribution of an incoming audio and/or video content stream;
    a process or service to generate a container or instantiation of the content processing and distribution processes for the subject audio and/or video stream (or combined audio/video stream); or
    other forms of account management services.
  Content (Audio and/or Video) Intake and Processing processes or services 518 (some of which may be performed by a Transcoding Server located on the same or a different platform), such as
    a process or service to intake an audio stream, where in some embodiments, an empty, blank, or replacement frame may be inserted if a corresponding video frame is lacking;
    a process or service to intake a video stream for processing and distribution, separate the video stream into individual frames, store each frame in a single frame container in a circular memory buffer, and associate each stored frame with a unique timestamp, where in some embodiments, a silent audio track may be inserted if a corresponding audio track is missing;
      if the received content stream is a combined audio/video stream, then a demultiplexing process may be performed to separate the content stream into an audio stream and a video stream for further processing;
      depending upon the format or transport protocol used by the source, decoding operations may be needed prior to other processing stages;
    a process or service to convert the demultiplexed and/or decoded stream(s) into an intermediate format (termed a "raw" format herein) which are stored as frames in a secondary shared memory circular buffer;

if desired, the raw format frames can be compressed, scaled, rotated, mixed with other content, and re-encoded using one of the standard encodings e.g., h.264, VP8, AAC, OPUS, etc. and then stored in a third shared memory circular buffer;

a process or service that provides the processed raw format frames to a Border server for distribution to end users/viewers;

Content (Audio and/or Video) Conversion and Distribution to End Users processes or services 520 (some of which may be performed by a Border Server located on the same or a different platform), such as a process or service that receives the raw format content frame-by-frame from a Transcoding server and converts (encodes) it into a desired format and in accordance with a desired protocol for distribution to an end user (where the desired format and protocol for an end user's device may be determined or discovered by a handshake or other suitable technique);

a process or service that establishes a peer on the distribution (Border) server (typically using an SFU) and operates to distribute the content to end users/viewers in accordance with a desired protocol (such as WebRTC);

a Border server may multiplex the processed audio and video streams into a combined stream prior to distribution to end-users; and administrative services 522, such as a process or services to enable the provider of the content processing services and/or the platform to administer and configure the processes and services provided to broadcasters or sources of the content, such as by altering pricing models, altering workflows for processing content, introducing new decoding/encoding capabilities, etc.

The platform or system shown in FIG. 5 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, web server, etc. A web server is a most often a combination of hardware and the software that helps deliver content, commonly by hosting a website, to client web browsers that access the web server via the Internet.

FIG. 6 is a diagram illustrating elements or components of an example operating environment 600 in which an embodiment may be implemented. As shown, a variety of clients 602 incorporating and/or incorporated into a variety of computing devices may communicate with a multi-tenant service platform 608 through one or more networks 614. For example, a client may incorporate and/or be incorporated into a client application (e.g., software) implemented at least in part by one or more of the computing devices. Examples of suitable computing devices include personal computers, server computers 604, desktop computers 606, laptop computers 607, notebook computers, tablet computers or personal digital assistants (PDAs) 610, smart phones 612, cell phones, and consumer electronic devices incorporating one or more computing device components, such as one or more electronic processors, microprocessors, central processing units (CPU), or controllers. Examples of suitable networks 614 include networks utilizing wired and/or wireless communication technologies and networks operating in accordance with any suitable networking and/or communication protocol (e.g., the Internet).

The distributed computing service/platform (which may also be referred to as a multi-tenant data processing platform) 608 may include multiple processing tiers, including a user interface tier 616, an application server tier 620, and a data storage tier 624. The user interface tier 616 may maintain multiple user interfaces 617, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant to administer the tenant's access to and use of the functions and capabilities provided by the service platform. This may include accessing tenant data, launching an instantiation of a specific application, causing the execution of specific data processing operations, etc. Each application server or processing tier 622 shown in the figure may be implemented with a set of computers and/or components including computer servers and processors, and may perform various functions, methods, processes, or operations as determined by the execution of a software application or set of instructions. The data storage tier 624 may include one or more data stores, which may include a Service Data store 625 and one or more Tenant Data stores 626. Data stores may be implemented with any suitable data storage technology, including structured query language (SQL) based relational database management systems (RDBMS).

Service Platform 608 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information. Such functions or applications are typically implemented by one or more modules of software code/instructions that are maintained on and executed by one or more servers 622 that are part of the platform's Application Server Tier 620. As noted with regards to FIG. 5, the platform system shown in FIG. 6 may be hosted on a distributed computing system made up of at least one, but typically multiple, "servers."

As mentioned, rather than build and maintain such a platform or system themselves, a business may utilize systems provided by a third party. A third party may implement a business system/platform as described above in the context of a multi-tenant platform, where individual instantiations of a business' data processing workflow (such as the content processing and distribution described herein) are provided to users, with each business representing a tenant of the platform. One advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 7 is a diagram illustrating additional details of the elements or components of the multi-tenant distributed computing service platform of FIG. 6, in which an embodiment may be implemented. The software architecture shown in FIG. 7 represents an example of an architecture which may be used to implement an embodiment of the invention. In general, an embodiment of the invention may be implemented using a set of software instructions that are designed to be executed by a suitably programmed processing element (such as a CPU, microprocessor, processor, controller, computing device, etc.). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 7 is a diagram illustrating additional details of the elements or components 700 of a multi-tenant distributed computing service platform, in which an embodiment of the invention may be implemented. The example architecture includes a user interface layer or tier 702 having one or more user interfaces 703. Examples of such user interfaces include graphical user interfaces and application programming interfaces (APIs). Each user interface may include one or more interface elements 704. For example, users may interact with interface elements to access functionality and/or data provided by application and/or data storage layers of the example architecture. Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 710 may include one or more application modules 711, each having one or more sub-modules 712. Each application module 711 or sub-module 712 may correspond to a function, method, process, or operation that is implemented by the module or sub-module (e.g., a function or process related to providing content processing and distribution services to a broadcaster or source). Such function, method, process, or operation may include those used to implement one or more aspects of the inventive system and methods, such as for one or more of the processes or functions described with reference to FIGS. 1, 2(a), 2(b), 3, 4, and 5. In some embodiments, these functions, methods, processes, or operations may include:

Content (Audio and/or Video) Intake and Processing processes or services (some of which may be performed by a Transcoding Server located on the same or a different platform), such as:
   a process or service to intake an audio stream, where in some embodiments, an empty, blank, or replacement frame may be inserted if a corresponding video frame is lacking;
   a process or service to intake a video stream for processing and distribution, separate the video stream into individual frames, store each frame in a single frame container in a circular memory buffer, and associate each stored frame with a unique timestamp, where in some embodiments, a silent audio track may be inserted if a corresponding audio track is missing;
   if the received content stream is a combined audio/video stream, then a demultiplexing process may be performed to separate the content stream into an audio stream and a video stream for further processing;
   depending on the format of the received content stream(s), they may need to be decoded after demultiplexing;
   a process or service to convert the demultiplexed and/or decoded stream(s) into an intermediate format (termed a "raw" format herein) which are stored as frames in a secondary shared memory circular buffer;
   a process or service that provides the processed raw format frames to a Border server for distribution to end users/viewers;

Content (Audio and/or Video) Conversion and Distribution to End Users processes or services (some of which may be performed by a Border Server located on the same or a different platform), such as:
   a process or service that receives the raw format content frame-by-frame from a Transcoding server and converts (encodes) it into a desired format and in accordance with a desired protocol for distribution to an end user (where the desired format and protocol for an end user's device may be determined or discovered by a handshake or other suitable technique);
   a process or service that establishes a peer on the distribution (Border) server (typically using an SFU) and operates to distribute the content to end users/viewers in accordance with a desired protocol (such as WebRTC);
   a Border server may multiplex the processed audio and video streams into a combined stream prior to distribution to end-users.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. Each application server (e.g., as represented by element 622 of FIG. 6) may include each application module. Alternatively, different application servers may include different sets of application modules. Such sets may be disjoint or overlapping.

The data storage layer 720 may include one or more data objects 722 each having one or more data object components 721, such as attributes and/or behaviors. For example, the data objects may correspond to tables of a relational database, and the data object components may correspond to columns or fields of such tables. Alternatively, or in addition, the data objects may correspond to data records having fields and associated services. Alternatively, or in addition, the data objects may correspond to persistent instances of programmatic data objects, such as structures and classes. Each data store in the data storage layer may include each data object. Alternatively, different data stores may include different sets of data objects. Such sets may be disjoint or overlapping.

Note that the example computing environments depicted in FIGS. 5-7 are not intended to be limiting examples. Further environments in which an embodiment of the invention may be implemented in whole or in part include devices (including mobile devices), software applications, systems, apparatuses, networks, SaaS platforms, IaaS (infrastructure-as-a-service) platforms, or other configurable components that may be used by multiple users for data entry, data processing, application execution, or data review.

Embodiments as described herein above can be implemented in the form of control logic using computer software in a modular or integrated manner. Based on the disclosure and teachings provided herein, a person of ordinary skill in the art will know and appreciate other ways and/or methods to implement one or more embodiments using hardware and a combination of hardware and software.

Any of the software components, processes or functions described in this disclosure may be implemented as software code to be executed by a processor using any suitable computer language such as Python, Java, JavaScript, C++, or Perl using conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set aside from a transitory waveform. Any such computer readable medium may reside on or within a single computational apparatus and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. Such computer-readable storage media allow the processing element or processor to access computer-executable process steps, application programs and the like, stored on removable and non-removable memory media, to off-load data from a device or to upload data to a device. As mentioned, with regards to the embodiments described herein, a non-transitory computer-readable medium may include almost any structure, technology, or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

While certain implementations of the disclosed technology have been described in connection with what is presently considered to be the most practical and various implementations, it is to be understood that the disclosed technology is not to be limited to the disclosed implementations. Instead, the disclosed implementations are intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, and to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural and/or functional elements that do not differ from the literal language of the claims, or if they include structural and/or functional elements with insubstantial differences from the literal language of the claims.

All references, including publications, patent applications, and patents, cited herein are hereby incorporated by reference to the same extent as if each reference were individually and specifically indicated to be incorporated by reference and/or were set forth in its entirety herein.

The use of the terms "a" and "an" and "the" and similar referents in the specification and in the following claims are to be construed to cover both the singular and the plural, unless otherwise indicated herein or clearly contradicted by context. The terms "having," "including," "containing" and similar referents in the specification and in the following claims are to be construed as open-ended terms (e.g., meaning "including, but not limited to,") unless otherwise noted.

Recitation of ranges of values herein are merely indented to serve as a shorthand method of referring individually to each separate value inclusively falling within the range, unless otherwise indicated herein, and each separate value is incorporated into the specification as if it were individually recited herein. All methods described herein can be performed in any suitable order unless otherwise indicated herein or clearly contradicted by context. The use of any and all examples, or exemplary language (e.g., "such as") provided herein, is intended merely to better illuminate embodiments of the invention and does not pose a limitation to the scope of the invention unless otherwise claimed. No language in the specification should be construed as indicating any non-claimed element as essential to each embodiment of the present invention.

As used herein (i.e., the claims, figures, and specification), the term "or" is used inclusively to refer to items in the alternative and in combination.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. A method of processing and distributing a content stream, comprising:
   receiving an incoming content stream from a source;
   providing the received content stream to a transcoding server, wherein the transcoding server operates to:
     demultiplex the content stream into an audio stream and a video stream if the content stream comprises both audio and video content;
     process the audio stream, video stream, or both to generate a set of individual audio frames, video frames, or both; and
     store each of the generated frames in a circular buffer;
   providing the generated frames to a distribution server;
   determining a desired format for an end user, wherein the format is one of either frames or segments of content;
   encoding the generated frames provided to the distribution server into the desired format;
   multiplexing the encoded frames into a stream of combined audio and video content;
   establishing a node on the distribution server, wherein the node is a WebRTC peer node for distribution of frames and operates to correct delivery errors by patching or dropping frames; and
   operating the distribution server node to distribute the stream of combined audio and video content to one or more of the end user or other WebRTC peer node in the desired format, whereby the stream is distributed with lower latency than achieved by a content delivery network.

2. The method of claim 1, wherein processing the audio stream, video stream, or both to generate a set of individual audio frames, video frames, or both further comprises decoding the stream or streams.

3. The method of claim 1, wherein determining a desired format for an end user further comprises determining one or more of a desired content format, an application being used to view content, or the audio or video codecs supported by the end user's device.

4. The method of claim 1, further comprising adding content to the encoded generated audio frames, video frames, or both prior to distributing the stream of combined audio and video content to the end user or other WebRTC peer node.

5. The method of claim 4, wherein the added content is one or more of an advertisement, text, a translation of content into a different language, or a means of accessing additional content that is not part of the incoming content stream.

6. The method of claim 1, wherein providing the generated frames to a distribution server further comprises receiving the generated frames at a first distribution server and providing the received frames to a second distribution server.

7. The method of claim 1, further comprising storing each of the frames provided to the distribution server in a circular buffer.

8. The method of claim 1, wherein the incoming content stream is received from the source in accordance with either the RTMP protocol or the RTP protocol.

9. A system for processing and distributing a content stream, comprising:
   one or more electronic processors configured to execute a set of computer-executable instructions; and
   the set of computer-executable instructions, wherein when executed, the instructions cause the one or more electronic processors to
   receive an incoming content stream from a source;
   provide the received content stream to a transcoding server, wherein the transcoding server operates to:
     demultiplex the content stream into an audio stream and a video stream if the content stream comprises both audio and video content;
     process the audio stream, video stream, or both to generate a set of individual audio frames, video frames, or both; and
     store each of the generated frames in a circular buffer;
   provide the generated frames to a distribution server;
   determine a desired format for an end user, wherein the format is one of either frames or segments of content;
   encode the generated frames provided to the distribution server into the desired format;
   multiplex the encoded frames into a stream of combined audio and video content;
   establish a node on the distribution server, wherein the node is a WebRTC peer node for distribution of frames that operates to correct delivery errors by patching or dropping frames; and
   operating the distribution server node to distribute the stream of combined audio and video content to one or more of the end user or other WebRTC peer node in the desired format, whereby the stream is distributed with lower latency than achieved by a content delivery network.

10. The system of claim 9, wherein processing the audio stream, video stream, or both to generate a set of individual audio frames, video frames, or both further comprises decoding the stream or streams.

11. The system of claim 9, wherein determining a desired format for an end user further comprises determining one or more of a desired content format, an application being used to view content, or the audio or video codecs supported by the end user's device.

12. The system of claim 9, wherein the instructions further cause the one or more electronic processors to add content to the encoded generated audio frames, video frames, or both prior to distributing the stream of combined audio and video content to the end user or other WebRTC node.

13. The system of claim 12, wherein the added content is one or more of an advertisement, text, a translation of content into a different language, or a means of accessing additional content that is not part of the incoming content stream.

14. The system of claim 9, wherein providing the generated frames to a distribution server further comprises receiving the generated frames at a first distribution server and providing the received frames to a second distribution server.

15. The system of claim 9, wherein the instructions further cause the one or more electronic processors to store each of the frames provided to the distribution server in a circular buffer.

16. A non-transitory computer-readable medium including a set of computer-executable instructions that when executed by one or more programmed electronic processors, cause the processors to process and distribute a content stream by:
  receiving an incoming content stream from a source;
  providing the received content stream to a transcoding server, wherein the transcoding server operates to:
    demultiplex the content stream into an audio stream and a video stream if the content stream comprises both audio and video content;
    process the audio stream, video stream, or both to generate a set of individual audio frames, video frames, or both; and
    store each of the generated frames in a circular buffer;
  providing the generated frames to a distribution server;
  determining a desired format for an end user, wherein the format is one of either frames or segments of content;
  encoding the generated frames provided to the distribution server into the desired format;
  multiplexing the encoded frames into a stream of combined audio and video content;
  establishing a node on the distribution server, wherein the node is a WebRTC peer node for distribution of frames that operates to correct delivery errors by patching or dropping frames; and
  operating the distribution server node to distribute the stream of combined audio and video content to one or more of the end user or other WebRTC peer node in the desired format, whereby the stream is distributed with lower latency than achieved by a content delivery network.

17. The non-transitory computer-readable medium of claim 16, wherein processing the audio stream, video stream, or both to generate a set of individual audio frames, video frames, or both further comprises decoding the stream or streams.

18. The non-transitory computer-readable medium of claim 16, wherein determining a desired format for an end user further comprises determining one or more of a desired content format, an application being used to view content, or the audio or video codecs supported by the end user's device.

19. The non-transitory computer-readable medium of claim 16, wherein the instructions further cause the processors to add content to the encoded generated audio frames, video frames, or both prior to distributing the stream of combined audio and video content to the end user or other WebRTC peer node.

20. The non-transitory computer-readable medium of claim 16, wherein providing the generated frames to a distribution server further comprises receiving the generated frames at a first distribution server and providing the received frames to a second distribution server.

* * * * *